Nov. 4, 1952 G. H. RIDINGS 2,616,963

TWO-WAY COMMUNICATION SYSTEM BETWEEN TWO FACSIMILE TRANSCEIVERS

Filed May 21, 1949 2 SHEETS—SHEET 1

INVENTOR.
G.H.RIDINGS
BY
ATTORNEY

Nov. 4, 1952 G. H. RIDINGS 2,616,963

TWO-WAY COMMUNICATION SYSTEM BETWEEN TWO FACSIMILE TRANSCEIVERS

Filed May 21, 1949 2 SHEETS—SHEET 2

INVENTOR.
G. H. RIDINGS

BY A. A. Thomas

ATTORNEY

Patented Nov. 4, 1952 2,616,963

UNITED STATES PATENT OFFICE 2,616,963

TWO-WAY COMMUNICATION SYSTEM BETWEEN TWO FACSIMILE TRANSCEIVERS

Garvice H. Ridings, Summit, N. J., assignor to The Western Union Telegraph Company, New York, N. Y., a corporation of New York Application May 21, 1949, Serial No. 94,596

20 Claims. (Cl. 178—6.6)

My invention relates to facsimile telegraph systems utilizing the machines of the so-called transceiver type in which the same machine is used to transmit a message to a distant machine and to make a facsimile record of a received message. An example of such a transceiver system is found in Wise Patent 2,315,361, issued March 30, 1943.

In prior facsimile systems using transceivers, it was necessary to provide each machine with a special send-receive switch that had to be set by the attendant in the right position in order to condition the machine for its intended operation. Thus, to set the machine for transmitting, the switch had to be in "Send" position and for recording the switch had to be in "Receive" position. If the switch was left in the wrong position, as would sometimes happen, the operator would get a warning signal and the machine would not operate until the switch was set right. This condition could arise in either machine and resulted in loss of time and waste of power.

It is the prime object of the present invention to do away with the hand-operated conditioning switch and its disadvantages in prior transceiver systems by providing a facsimile machine which automatically sets itself up as a transmitter or as a receiver by the mere closing of a start switch. When two of these transceivers are connected for communication, the first one to be operated automatically acts as a transmitter and the second machine is automatically set up as a recorder under control of the first machine. The operation of this machine is exceedingly simple and requires no skill on the part of the attendant. To transmit a message it is only necessary (assuming a sheet mounted on the drum) to close the start switch. This sounds a buzzer at the second machine where the attendant mounts a recording blank on the drum and throws the start switch to "on" position. Once started, both machines take care of themselves and automatically shut down at the end of a transmission.

Figures 1, 2:
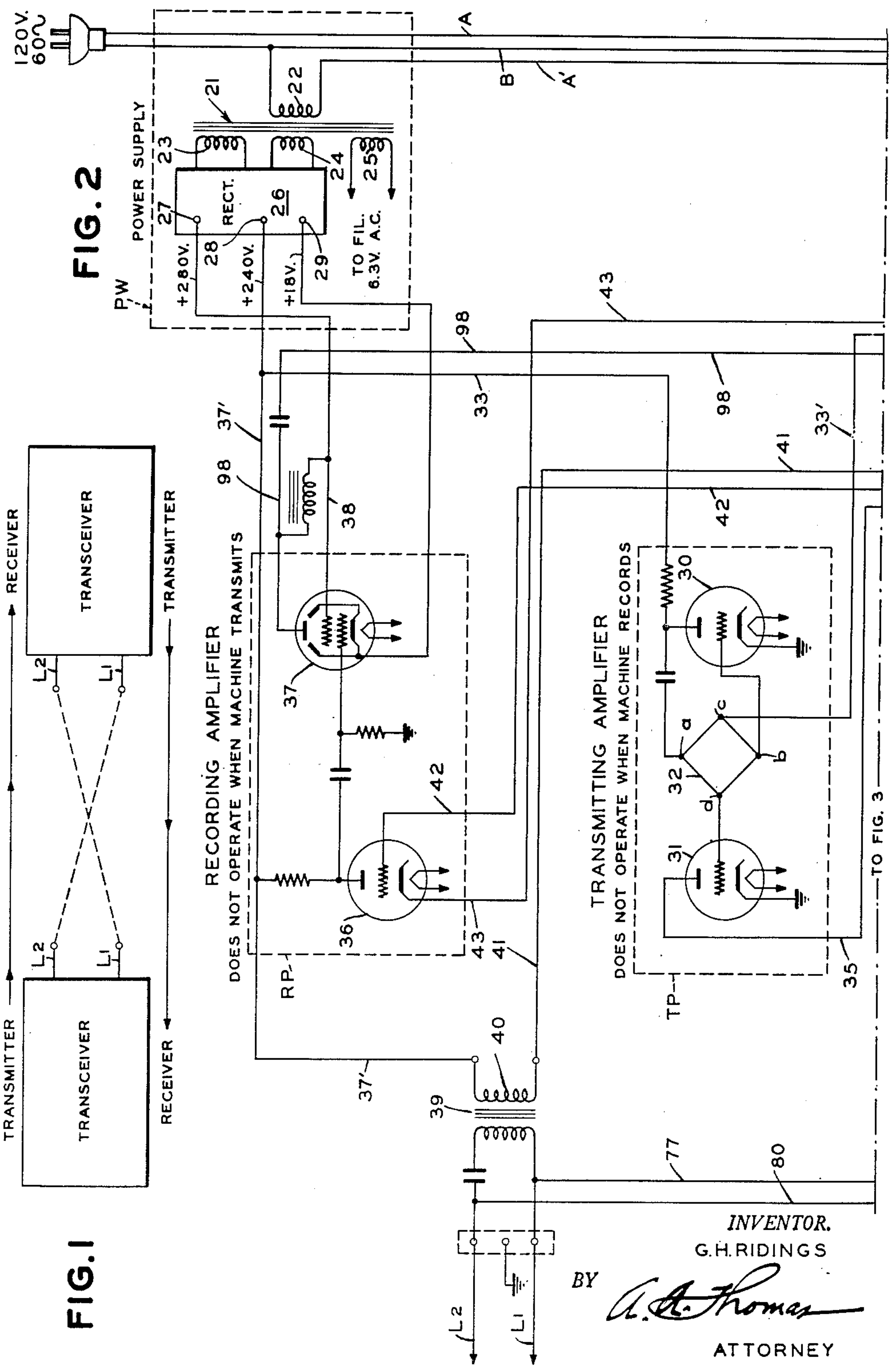

To explain the novel control circuits which form the basis of my invention, I have applied them to the simple form of transceiver disclosed in the pending application of Ridings (and others) Serial No. 33,345, filed June 16, 1948, to which reference may be had for structural details not necessary to include here. I have, therefore, confined the accompanying drawings to the electrical installation that goes with each machine for carrying out the purposes of this invention. In those drawings, Fig. 1 represents schematically the connection of two machines in my two-way communication system, and Figs. 2 and 3 taken together show the control circuits which effect the automatic set-up of the transceiver for the required operation.

Regarding the transceiver construction, it is sufficient to say that the scanning mechanism of the machine comprises a rotary drum 12 on which a message sheet or recording blank 12' is mounted with the ends overlapping at 12*a*, a carriage 13 slidable along a fixed track 14 and pivotally mounted to move into and out of scanning position, and an electric stylus 15 supported on the carriage and movable thereby in scanning relation to a sheet on the drum. A synchronous motor 16 rotates the drum at high scanning speed, and a second synchronous motor 17 drives the stylus carriage 13 slowly along its track to move the stylus in a straight line across the rapidly rotating paper. A phasing commutator 18 carrying a grounded contact 19 is mounted on the drum shaft to rotate therewith, and a brush 20 touches the contact 19 briefly once for each turn of the drum 12.

The electric apparatus that goes with each machine comprises a power supply unit PW, a transmitting amplifier TP, a recording amplifier RP, and a set of control relays which will be separately described later on. It may be assumed that the electric units PW, TP and RP are the same as those shown and described in detail in the aforementioned Ridings application Serial No. 33,345, so that here it will suffice if I present those units in simplified form, indicating only such circuit connections as are required for this description.

The power supply unit PW is connected by a pair of leads or bus bars A and B to a commercial source of 120 volts, 60-cycle A. C. current. A transformer 21 has a primary coil 22 and three secondary coils 23, 24 and 25. The primary coil 22 is connected to the bus bar B and to an auxiliary lead A'. The two secondaries 23 and 24 connect with a rectifier 26, and the secondary 25 supplied current for the filaments of all the tubes in the amplifiers RP and TP. The direct current output of rectifier 26 is taken from terminals 27, 28 and 29 to supply the required operating voltages for the tubes in the amplifiers. The voltage numerals appearing in Fig. 2 in connection with the D. C. terminals 27, 28 and 29 and with the secondary coil 25 are merely illustrative to clarify the circuit diagram and are in no sense restrictive.

The transmitting amplifier TP has an input oscillator tube 30, an output tube 31, and an interposed bridge circuit 32 for the stylus. The details of this bridge circuit are shown in Fig. 27*a* of the Ridings application referred to. So here I need only mention that the points *a* and *b* are the input terminals connected to the oscillator tube 30, and the opposite points *c* and *d* constitute the output terminals of the bridge. A conductor 33 connects the bridge input terminal *a* with the D. C. supply terminal 28, while the opposite input terminal *b* is connected to the control grid of oscillator tube 30. The bridge output terminal *c* is connected to the stylus 15 by way of conductor 33′, closed relay contacts 34 and conductor 34′. The other output terminal *d* goes to the control grid of output tube 31. The plate of this tube is connected by wire 35 to a normally open relay contact 35′. In other words, we may regard the conductor 33 as the power input of the transmitting amplifier TP and the two conductors 33′ and 35 as the amplified signal output.

In the recording amplifier RP, I have shown only the input tube 36 and the output tube 37. For simplicity I have shown the tube 36 as a triode, though in practice I prefer to use a pentode. The D. C. power conductor 37′ supplies plate current for tube 36, and conductor 38 from the D. C. terminal 27 is connected to the plate and screen grid of tube 37.

A transformer 39 couples both amplifiers to the transmission lines L1, L2. One side of transformer coil 40 is connected to conductor 37′, and the other side of this coil goes by way of wires 41 and 42 to the control grid of tube 36 through relay contacts to be described later. The plate-cathode circuit of tube 36 is completed through wire 43 to ground through certain relay contacts, as will presently be made clear.

The machine has a suitable start switch 44 which can be closed and opened by hand any time and which is also moved automatically to open position by the stylus carriage 13, as fully described in the Ridings application previously mentioned. For the purposes of the present description we need only understand that when the stylus carriage 13 reaches the end of its prescribed line of travel it automatically opens the switch 44 and stops the machine. In case of a short message, the operator can throw the switch 44 to "off" position when he sees that the entire message has been scanned.

The automatic set-up of the machine for transmitting or recording and its phasing with the distant machine in the system is effected by novel circuits under the control of a series of relays numbered consecutively from 45 to 51. The dotted rectangle around each relay encloses the contacts controlled thereby. For distinction I shall identify these relays as follows: The line relay 45, the end-of message relay 46, the phasing relay 47, the transmitter relay 48, the receiver relay 49, the local-pulse relay 50, and the slow-release relay 51. The functions and timed operations of these relays will be fully described in the required order.

Figure 3:
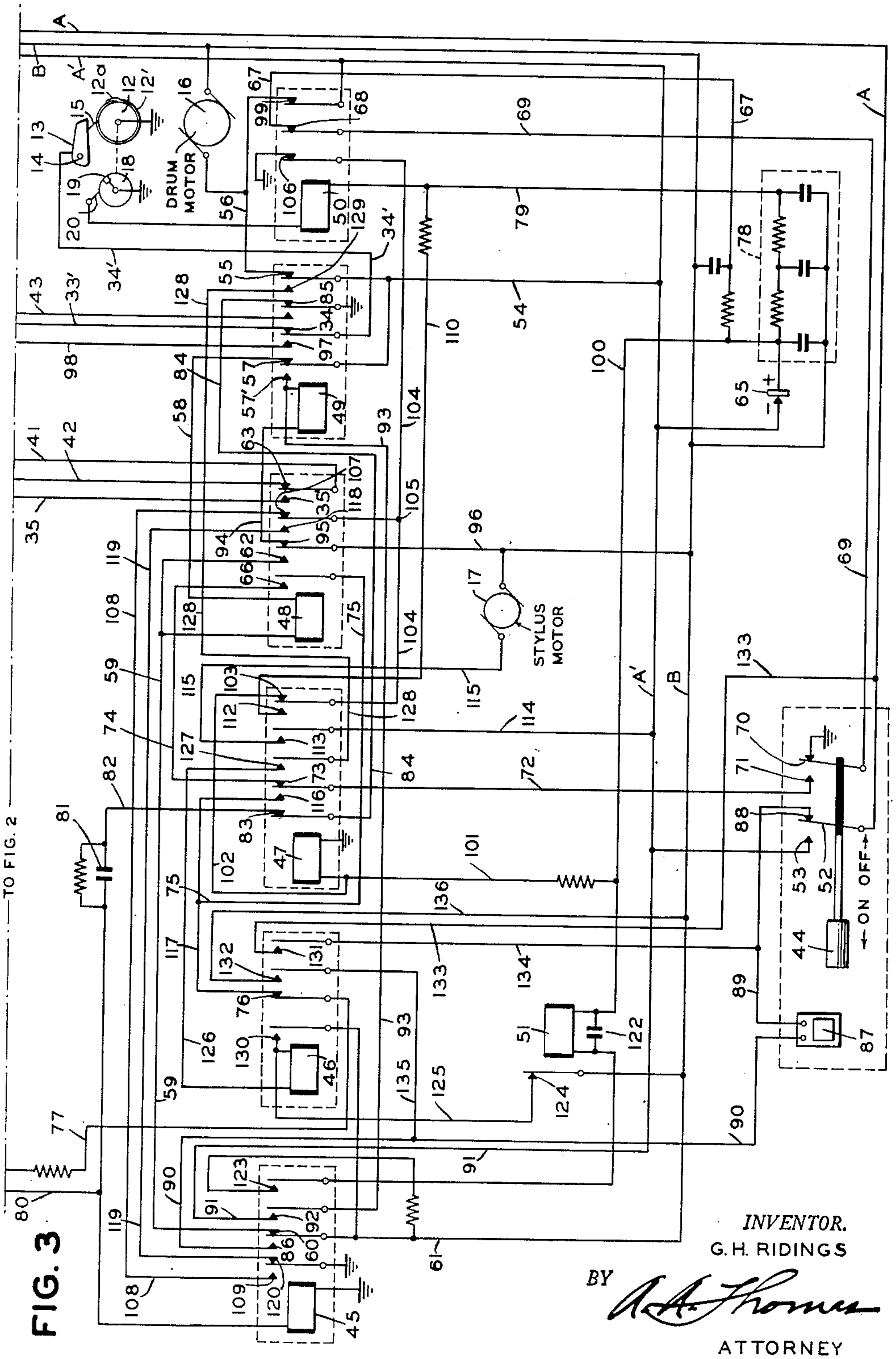

Fig. 3 shows the contacts of all the relays in their respective normal positions, that is to say, the positions they occupy when the relays are not energized. In tracing the circuits it will be convenient to designate each pair of relay contacts by the stationary contact alone (whether make or break) so as to prevent an excess of reference numerals.

Let us suppose that two of these facsimile transceivers are connected for two-way communication through the lines L1 and L2 which are a twisted or transposed pair of conductors, as indicated in Fig. 1. Assume that the attendant at the first machine wants to send a message to the second machine. In other words, the first machine is now going to operate as a transmitter and the second machine as a recorder.

With the message properly wrapped around the drum 12, the attendant at the first machine moves the start switch 44 to "on" position. This connects the main bus bar A with the auxiliary bus bar A′ through the closed switch contacts 52—53 and thereby energizes the transformer 21 of the power unit PW. The tube filaments are lighted and the required D. C. voltages are supplied from rectifier 26 to the plates of the amplifier tubes. At the same time the drum motor 16 is energized from bus bar A′ through wire 54, closed contacts 55 of relay 49 (not energized), wire 56 and through the motor windings to bus bar B. The drum 12 that carries the message sheet is now rotating, but the stylus 15 is still inactive so that no scanning takes place.

The closing of switch contacts 52—53 also energizes the transmitter relay 48. This circuit goes from bus bar A′ through wire 54, closed contacts 57 of relay 49 (not energized), wire 58, through coil of relay 48, wire 59, closed contacts 60 of line relay 45 (not yet energized) and by wire 61 back to bus bar B. The relay 48 locks through its closed contacts 62, so that it stays energized independently of relay contacts 60.

The operation of relay 48 automatically prepares the machine as a transmitter. The opening of back contact 63, to which the grid conductor 42 is connected, disconnects the recording amplifier from transformer 39 by opening the grid circuit of tube 36. At the same time the closing of contact 35′ of relay 48 connects the transformer coil 40 through wires 41 and 35 to the plate of output tube 31 in the transmitting amplifier TP.

A selenium rectifier 65 (or similar device) is connected to the bus bars A—B and operates as a source of direct current. The closing of contacts 66 of transmitter relay 48 sends battery from rectifier 65 through wire 67, closed contacts 68 of relay 50 (not yet energized), wire 69, closed contacts 70—71 of start switch 44, wire 72, closed contacts 73 of unenergized relay 47, wire 74, closed contacts 66 of energized relay 48, wire 75, closed contacts 76 of relay 46 (not energized) and by wire 77 to line L1.

Still referring to the transmitter, battery from rectifier 65 also goes to relay 50 through a delaying network of resistors and condensers indicated as a unit by the rectangle 78. This network is connected by wire 79 to one side of relay 50. The other side of this relay goes to the commutator brush 20, so that the relay circuit is closed briefly through the grounded contact 19 once for each revolution of commutator 18, which always turns with the drum 12. The delayed operation of relay 50 gives the drum motor 16 time to acquire synchronous speed before phasing. It will thus be understood that relay 50 pulses in synchronism with the speed of drum 12, and every time the relay operates it opens its contacts 68 to interrupt the flow of battery current to line L1. It should be noted that the circuit of the drum motor 16 is independent of the pulsing relay 50 and runs at synchronous speed directly the machine is turned on as a transmitter. Therefore, the battery signals sent out by the transmitter pulse with the synchronous speed of motor 16.

Now let us see how the distant second machine (which is to operate as a receiver) responds to the synchronous battery signals coming from the transmitter over line L1. These signals or pulses arrive at the second machine over line L2 from which they go by wire 80 through relay 45. This relay is shunted by a condenser 81 in a circuit that goes through wire 82, closed contacts 83 of relay 47 (not energized), wire 84 and through the closed contacts 85 of relay 49 (not energized) to ground. The purpose of condenser 85 is to prevent the line relay 45 from following the synchronous battery pulses coming from the transmitter, so that this relay does not release during the brief interruptions of the line signals by the transmitter commutator.

The energizing of line relay 45 at the receiver by the battery signals from the transmitter closes the contact 86 to operate a buzzer 87 as a calling signal for the attendant. The buzzer circuit goes from bus bar A through closed contact 88 of start switch 44 (still in "off" position), wire 89, through the buzzer coil, wire 90, closed contact 86 of relay 45, and by wire 61 to bus bar B. When the attendant hears the buzzer, he loads a recording blank on his drum and throws the start switch 44 to "on" position. This opens the buzzer circuit at switch contact 88 and energizes the power transformer 21 for the tubes in the amplifiers, as previously explained for the transmitter.

The closing of start switch 44 at the receiver has no effect on the line relay 45, which continues to operate in response to the battery pulses from the transmitter. This operation of relay 45 causes the relay 49 to be energized from bus bar A through closed switch contacts 52—53, auxiliary bus bar A', wire 91, closed contacts 92 of relay 45, wire 93, through relay 49, wire 94, through closed contacts 95 of relay 48 (not energized) and by wire 96 to bus bar B. The relay 49 locks through its make contact 57'. Incidentally, it should be noted that the operation of the transmitter relay 48 is prevented by the opened contact 57 of energized relay 49.

The operation of relay 49 automatically sets the machine up as a receiver, just as the operation of relay 48 in the first machine set it up as a transmitter. The closed contacts 97 of the energized relay 49 connect the recording stylus 15 to wire 98 which goes to the plate of output tube 37 in the recording amplifier RP. At the same time the opening of contacts 34 of relay 49 disconnects the stylus from the transmitting amplifier TR, which therefore remains inoperative when the machine is in condition to record.

The closing of switch 44 at the receiver connects the selenium rectifier 65 to the bus bars A—B, and the plus side of this direct current source goes through the delay network 78 through wire 79 to the pulse relay 50 and the commutator contacts 19—20, as previously described for the transmitter. This time the circuit of drum motor 16 is closed through the contacts 99 of relay 50 because the contacts 55 of the energized relay 49 are held open. Therefore, every time the relay 50 is operated it breaks the contacts 99 and momentarily interrupts the circuit of motor 16, causing it to run slightly below synchronism.

When the energized relay 49 of the receiver opens its contacts 85, it disconnects the condenser 81 from the circuit of line relay 45, which is now free to pulse at the synchronous speed of the transmitter drum. However, the relay 50 of the receiver is pulsing at the sub-synchronous speed of the receiver drum. We should also remember that the line relay 45 is energized most of the time, releasing only for a short battery signal from the transmitter, whereas the relay 50 is deenergized most of the time and operates only for a short interval when the commutator contacts 19—20 are closed.

At this moment the two machines are in the following condition: The transmitter drum 12 is running at synchronous speed, causing battery signals to be sent over the line at synchronous intervals. At the receiver the recording drum 12 is running at less than synchronous speed, while the line relay 45 is pulsing in synchronism with the battery signals received from the transmitter. In other words, the two machines are not yet in phase and the styluses 15 are still inoperative, so that no scanning is taking place.

This brings us to a consideration of the phasing relay 47 at the receiver. One side of this relay is connected by wires 100 and 101 to the plus side of the battery source 65, and the other side of the relay is grounded. Normally the coil of this relay is shorted out through two parallel paths which go by wire 102 through the closed contacts 103 of relay 47 (not yet energized) and by wire 104 to point 105. Here the two paths divide, one going to ground through the contacts 106 of relay 50 (every time the latter is released) and the other path going to ground through the closed contacts 107 of relay 48 (not energized) and by wire 108 through contacts 109 of relay 45, whenever the latter is energized by the battery signals from the transmitter.

It is clear from the foregoing that the relay 47 at the receiver can not be energized if either grounding circuit is closed, and to remove both grounds simultaneously it is necessary that the release of relay 45 coincide with the operation of relay 50. When that occurs the phasing relay 47 at the receiver is energized and removes both grounds by the opening of its contacts 103, so that it stays energized to carry out its intended function of phasing the two machines from the receiver in the following manner:

The operation of relay 47 at the receiver puts ground on the battery side of relay 50 through wire 110, closed contacts 112 of relay 47, wire 104 and contacts 106 of relay 50, whereby the latter is prevented from operating. Consequently, the circuit of the recording motor 16 remains continuously closed and the motor now runs at regular synchronous speed in phase with the transmitting motor. The drums of the two machines are now operating in phase. That is to say, the two drums are in the same angular position in relation to the overlapping ends 12a of the sheet of paper 12' mounted on each drum. With the two machines thus phased, they are in condition for scanning by their respective styluses 15.

Still referring to the receiver, the closing of contacts 113 of the energized phasing relay 47 completes the circuit of stylus motor 17 from the bus bar A' through wire 114, contacts 113, wire 115 and through the motor windings to bus bar B. The operation of stylus motor 17 in either machine automatically lowers the stylus 15 into contact with the paper on the drum and slowly moves the carriage 13 along its track 14. The mechanism for accomplishing this stylus operation is fully shown and described in the Ridings application Serial No. 33,345. So far as the present specification is concerned, it is sufficient to say that the operation of motor 17 sets the associated stylus mechanism in operation either for transmitting or recording.

The release of relay 50 at the receiver upon the operation of the phasing relay 47 causes steady battery to be applied to line L1 from the D. C. source 65 through wire 67, closed relay contacts 68, wire 69, closed contacts 70—71 of switch 44, wire 72, closed contacts 116 of energized relay 47, wire 117, closed contacts 76 of relay 46 (not energized) and by wire 77 to line L1.

Now we go back to the transmitter to see what happens there in response to the steady battery current applied to line L1 from the receiver. As previously mentioned, at this time the drum motor 16 at the transmitter is running, but the stylus mechanism is not yet operating. The steady battery current from the receiver goes over line L2 at the transmitter to relay 45 by wire 80. This relay is now energized for the first time. Until this moment the phasing relay 47 of the transmitter has remained unenergized because of its being shorted out by its own closed contacts 103 through two grounded paths. One of these goes from point 105 to closed contacts 106 of relay 50 (which is still pulsing at the transmitter), and the other ground path goes from point 105 to the closed contacts 118 of energized relay 48, then by wire 119 to the closed grounded contact 120 of relay 45 (not yet energized).

When the line relay 45 of the transmitter is energized by battery from the receiver, the opening of contact 120 breaks one of the grounds of relay 47. Therefore, when the pulsing relay 50 is operated at the next revolution of the drum shaft (by the closing of commutator contacts 19—20), the second ground is removed from the phasing relay 47 by the opening of contact 106. This relay is now energized from the battery source 65 through wires 100 and 101. The stylus motor 17 is now connected to bus bars A and B through the closed contacts 113 of relay 47, whereupon the transmitting stylus 15 starts scanning of the message sheet mounted on the synchronously driven drum 12. The message may be written or typed on a sheet of conducting material, as explained in the Ridings application referred to, but any other practical way of preparing copy may be used.

The signals produced by the transmitting stylus as it scans the subject copy (in a manner well understood by facsimile engineers) are fed into the transmitting amplifier TP through wire 34′, closed contacts 34 of relay 49 (not energized) and by wire 33′ to point *c* of bridge 32. The signal voltages resulting from the unbalancing of the bridge are imposed on the grid of amplifying tube 31 which sends them out to the line on the carrier frequency of oscillator 30. The output line 35 of the transmitting amplifier goes to the coil 40 of transformer 39 by way of closed contacts 35′ of the energized relay 48 and wire 41. The transformer 39 sends the facsimile signals over the transmission lines L1—L2 to the connected receiver.

At the receiver the incoming signals pass through the secondary coil 40 into the plate circuit of input tube 36 in the recording amplifier RP, where they are amplified and pass to the recording stylus 15 through conductor 98, closed contacts 97 of energized relay 49, and by wire 34′ to the stylus 15. We are to assume that the recording blank on drum 12 is of the electrosensitive type adapted to be acted on by the signal voltages impressed on the stylus to produce a facsimile record of the transmitted copy. This manner of recording is well understood and requires no description.

It is now time to call attention to the function of relay 51, which has so far played only the negative role of holding the circuit of relay 46 open. The relay 51, which is slow to release because of the condenser 122, is energized from the battery source 65 only when the relay 45 is operated and closes its contacts 123. During the pre-phasing operation of the two machines when the relay 45 pulses under the control of commutator 18, the relay 51 remains energized during the momentary breaks of its circuit by contacts 123 and holds its own contacts 124 open, which remain open in both machines during the entire transmission period. As long as the contacts 124 stay open, the relay 46 can not be energized.

During the transmission of a message the line relays 45 of both machines are kept energized by steady battery sent from each machine to the other over the lines L1—L2 without interfering with the facsimile signals impressed on the carrier frequency. If the transmitting stylus scans the entire sheet (as for a long message), the recording stylus will do likewise, and in each machine the stylus carriage 13 will automatically open the switch 44 at the end of its travel. The two machines are thus shut down automatically at the same time and restored to normal condition.

Suppose, now, that the transmitter is stopped manually before the stylus carriage completes its prescribed line of travel, as when a short message is being transmitted. Upon the complete scanning of this message, the attendant throws the switch 44 to "off" position, since it would be a waste of time and power to keep on scanning the remaining blank portion of the message sheet. The effect of this manual opening of switch 44 at the transmitter has the following effect on the receiver, where the attendant naturally knows nothing about the length of the message that is coming over:

Although the opening of transmitter switch 44 cuts off the local power and stops the machine, the relay 45 remains energized because it continues to receive steady battery from the reiver which is still running. Disconnecting the power from the transmitter removes battery from the line L1, which is connected to line L2 of the receiver. Therefore, the relay 45 of the receiver is deenergized and releases its contacts, which now remain in normal position as shown in Fig. 3. The opening of contacts 123 breaks the circuit of relay 51 which closes its contacts 124 and thereby completes the circuit of relay 46 from bus bar B, wire 125, through the relay windings, wire 126, closed contacts 127 of energized relay 47, wire 128, closed contact 129 of energized relay 49, by wire 54 to bus bar A′, and through the closed switch contacts 52—53 to bus bar A. Relay 46 locks through its contacts 130.

The energizing of the end-of-message relay 46 at the receiver performs the following automatic functions while the start switch 44 still remains closed: The opening of relay contacts 76 removes battery from line L1, thus releasing the relay 45 at the transmitter which is now completely shut down. The closing of contacts 131 and 132 of relay 46 operates the buzzer 87 through a circuit from bus bar A to wire 133, relay contacts 131, wire 134, through the buzzer winding to wire 90, from there by wire 135 through contacts 132 and by wire 136 to bus bar B. The stylus motor 17 will remain energized because the phasing relay 47 has not been released, and the carriage 13 will continue to travel, even though the stylus 15 is now not recording.

The buzzer 87 sends an end-of-message signal to the receiver attendant and he is supposed to answer it by opening the switch 44. However, if the attendant happens to be out or otherwise fails to open the switch 44 in response to the buzzer signal, the stylus carriage 13 will keep on moving until it throws the switch 44 to "off" position. When this switch is opened, whether manually by the attendant or automatically by the scanning carriage, all power is disconnected from the receiver.

It will be convenient for a ready understanding of my invention to append a summary of the automatic operating steps that take place in each machine from the moment the start switch at the transmitter is first closed until the opening of the power switch at the receiver at the end of a transmission.

*At the transmitter.*—The drum being loaded with the message, the operator closes the switch 44. This connects the machine with the power mains A—B, thereby energizing the amplifier TP, the synchronous drum motor 16 and the transmitter relay 48. The operation of this relay connects the circuit of stylus 15 to the transmitting amplifier TP and connects the latter to the line coupling transformer 39, at the same time disconnecting the recording amplifier RP. Direct current from rectifier 65 operates the pulse relay 50, which causes battery signals to be sent to line L1 in synchronism with the speed of drum 12.

*At the receiver.*—The battery pulses coming from the transmitter energize the line relay 45 which closes the circuit of buzzer 87 to call the operator to the machine. After loading the drum with a sheet of recording paper, the operator closes the switch 44. This stops the buzzer, applies power to the machine from the bus bars A—B and energizes relay 49 which connects the stylus 15 to the output of recording amplifier RP. Battery from source 65 operates the pulse relay 50 which causes the drum motor 16 to run slightly below synchronism by periodically interrupting its circuit. When the release of relay 45 coincides with the operation of relay 50, the phasing relay 47 is energized with this result: the drum motor 16 now runs at synchronous speed, the stylus motor 17 is energized to move the stylus carriage 13 for scanning, and steady battery from 65 is applied to line L1.

*At the transmitter.*—The steady battery from the receiver operates relay 45 which in turn energizes the phasing relay 47 to start the stylus motor 17. Scanning now begins at both machines, which operate in phase during the entire transmission cycle. At the close of a transmission, each machine shuts itself off automatically, unless the switch 44 at the transmitter is opened by hand in case of a short message.

For the sake of clearness, I have described the various steps in the automatic setting up and phasing of the two machines as apparently consecutive events. In reality, however, these steps take place practically at the same time. There is only an interval of seconds between the closing of switch 44 at the transmitter and the beginning of the scanning operation. In the particular machine actually used, the entire message area is covered by the stylus in two minutes, with correspondingly less time required for a short message.

It will be seen from the preceding description that I have provided a simple two-way communication system between two facsimile machines either of which sets itself up automatically as a transmitter or as a recorder. The operation of the transceiver is exceedingly simple and requires a minimum of attention. In fact, the only manual operations that the attendant has to perform are the loading of the drum and the closing of the start switch. After that the machines take care of themselves.

One of the fundamental features of my invention lies in the fact that, when two machines are connected for communication, the one that is turned on first becomes a transmitter and automatically conditions the other machine as a recorder. This is accomplished primarily through the line relay 45, for it is the condition of this relay when the machine is first turned on that determines whether the machine will operate as a transmitter or as a recorder. Thus, if the relay 45 is not energized when the start switch 44 is closed, the machine will operate as a transmitter. On the other hand, if the relay 45 is already energized when the start switch is closed (as when the attendant at the second machine acts in response to the buzzer), then the machine automatically acts as a recorder. Therefore, merely turning on the first machine to transmit a message automatically transforms the second machine into a recorder of the message. I believe this concept to embody basic novelty and I claim it as such.

Although I have described my invention in reference to a machine like that shown in the pending Ridings application Ser. No. 33,345, I want it understood that the novel features characterizing my invention are not limited to any particular construction of transceiver. Broadly speaking, I can use any practical form of transceiver that will respond to the various controls embodied in my automatic two-way facsimile system as defined in the appended claims.

I claim as my invention:

1. A facsimile system having two machines connected for communication, each machine being constructed to operate as a transmitter and as a recorder, a power switch for each machine, means whereby the closing of the power switch in the first machine automatically sets up that machine as a transmitter, and electric means in the second machine automatically energized by the closing of said first power switch for setting up the second machine as a recorder when its power switch is closed.

2. In a two-way facsimile system, a machine constructed to operate as a transmitter and as a recorder, a relay in said machine adapted to be energized over a transmission line of the system, a power switch for the machine, and means whereby the energized or unenergized condition of said relay at the moment when the switch is turned on automatically determines the transmitting or recording operation of the machine.

3. A facsimile system having two machines connected for communication, each machine being constructed to operate as a transmitter and as a recorder, a power switch in each machine for turning it on and off, and means whereby the first machine to be turned on operates as a transmitter and automatically conditions the second machine as a recorder, said automatic conditioning means including signals sent out by the first machine to the second machine and a control device at the second machine energized by said signals.

4. A facsimile system having two machines connected for communication, each machine having transmitting mechanism and recording mechanism, a stylus adapted to be connected to either mechanism, a power switch for each machine, means whereby the stylus of the first machine to be turned on is automatically connected to its transmitting mechanism, and means whereby the stylus of the second machine is automatically connected to its recording mechanism when the second machine is turned on.

5. A facsimile system having two machines connected for communication, each machine being operable for transmitting and recording facsimile signals, a start switch for each machine, means whereby the closing of said switch at the first machine automatically sets this machine up for transmitting, an electric device at the second machine automatically energized in response to the closing of said switch at the first machine, and mechanism controlled by the energized condition of said device for automatically causing the second machine to operate as a recorder when its start switch is closed.

6. A facsimile system having two machines connected for communication, each machine being constructed to operate as a transmitter and as a recorder, a local source of power for each machine and a switch for turning the power on and off, means whereby the closing of said switch at the first machine automatically sets this machine up as a transmitter, and means whereby the closing of the switch at the second machine automatically sets that machine up as a recorder, said last mentioned means including a circuit control device automatically conditioned by the closing of the first switch.

7. A facsimile system having two machines connected for communication, each machine having a stylus adapted to transmit and to record facsimile signals, a transmitting network and a recording network in each machine, a start switch for each machine, means whereby the closing of said switch at the first machine automatically connects its stylus to the transmitting network, electric means at the second machine automatically energized in response to the closing of the switch at the first machine for conditioning the second machine as a recorder, and means energized by the closing of the start switch at the second machine for automatically connecting its stylus to the recording network.

8. In a facsimile system having two machines connected for communication over a pair of lines, each machine being constructed to operate as a transmitter and as a recorder, a local source of power for each machine and a switch for turning the power on and off, a relay in each machine so connected in circuit as to be energized only by current sent over the line from the other machine, and electric apparatus in each machine controlled by the unenergized condition of its line relay when the power is first turned on for automatically setting that machine up as a transmitter.

9. A facsimile system having two machines connected for communication over a pair of lines, each machine being constructed to operate as a transmitter and as a recorder, a local source of power for each machine and a switch for turning the power on and off, a relay in each machine so connected in circuit as to be energized only by current sent over the lines from the other machine, and electric apparatus in each machine controlled by the energized condition of its line relay when the power is first turned on for automatically setting that machine up as a recorder.

10. A facsimile system having two machines connected for communication, each machine having transmitting mechanism and recording mechanism, a power switch for each machine, means whereby the closing of the power switch in the first machine automatically energizes its transmitting mechanism and sets the machine up as a transmitter, means for automatically sending signals from the first machine to the second machine when the first switch is turned on, and automatic means conditioned by said signals and operable on the closing of the power switch in the second machine to energize its recording mechanism and set that machine up as a recorder.

11. A facsimile system having two machines connected for communication, each machine being constructed to transmit and to record facsimile signals, a local source of power for each machine and a switch for turning the power on and off, means whereby the machine whose power is turned on first is automatically set to operate as a transmitter, means automatically controlled by the energizing of the first machine to cause the second machine to operate as a recorder when the second machine is energized by the closing of its switch, and means controlled by the energized condition of the second machine for automatically phasing the two machines at a predetermined moment.

12. A facsimile system having two machines connected for communication, each machine being constructed to operate as a transmitter and as a recorder, a transmitter relay and a receiver relay in each machine, a source of power for each machine and a switch for turning the power on and off, circuit connections for energizing the transmitter relay of the machine whose power is first turned on, apparatus controlled by the energizing of said transmitter relay for automatically setting up the first machine as a transmitter of facsimile signals, circuit connections for energizing the receiver relay of the second machine when its power is turned on, and apparatus controlled by the energizing of said receiver relay for automatically setting up the second machine as a recorder in phase with the transmitter.

13. In a facsimile machine having a rotary scanning drum and a synchronous motor for operating the same, phasing apparatus comprising means to interrupt the motor circuit periodically so as to operate said motor at non-synchronous speed said means including a relay energized from a local source of power and pulsing in unison with the non-synchronous speed of the motor, a phasing relay, and means utilizing the pulsing of the first relay to energize the phasing relay at a predetermined moment and thereby prevent further interruption of said motor circuit, whereby the motor starts running at regular synchronous speed to rotate the drum for scanning.

14. In a facsimile system having a transmitter and a recorder connected for communication, each machine having a sheet holding drum and a synchronous motor for operating the same, a source of power for each machine and a switch for turning the power on and off, automatic phasing apparatus for said drums comprising circuit connections at the transmitter for operating its motor at synchronous speed when the power is turned on, means at the transmitter for generating current pulses in synchronism with the speed of the transmitting motor, said synchronous pulses being sent over the line to the recorder, a relay at the recorder adapted to be energized by said synchronous pulses, a second relay at the recorder adapted to be energized periodically when the local power at the recorder is turned on, circuit connections controlled by the second relay to provide an interrupted circuit for the recording motor which thereby runs below synchronous speed and causes the second relay to pulse at said speed, and means jointly controlled by said pulsing relays to provide a continuously closed circuit for the recording motor and bring it up to synchronous speed when the sheets on the two rotating drums are in the same angular position for scanning.

15. A facsimile machine constructed to operate as a transmitter and as a recorder, said machine having a scanning drum and a synchronous motor for operating the same, means for connecting the machine to a source of power and a switch for turning the power on and off, a commutator rotatable with said drum, a relay adapted to be energized briefly through said commutator once for each revolution of the drum whereby said relay pulses in synchronism with said motor, a pair of contacts interrupted by said relay when energized, a circuit for said motor going through said contacts which interrupt the motor circuit once for each revolution of the drum and thereby cause the motor to run below its synchronous speed, a second circuit for said motor independent of said relay contacts to energize the motor continuously and thereby operate it at synchronous speed, mechanism operable upon the closing of said switch when the machine is to operate as a transmitter for energizing the motor through its continuously closed circuit, other machanism operable upon the closing of said switch when the machine is to operate as a recorder for energizing the motor through its interrupted circuit to cause it to run below synchronous speed, a phasing relay, means utilizing the subsynchronous speed of said motor to energize said phasing relay, and circuit connections controlled by the energized phasing relay to cause the recorder motor to run at synchronous speed.

16. Phasing apparatus for a facsimile machine having a rotary scanning drum and a synchronous motor for operating the same, comprising means energized by local power for momentarily interrupting the motor circuit for each revolution of the drum, whereby the motor runs at subsynchronous speed, an interrupter energized by and adapted to follow synchronous signals received from a distant terminal, a relay connected to operate when said motor interrupting means and said synchronous interrupter operate in step, and means whereby said energized relay causes the motor to run at synchronous speed.

17. In a facsimile system having two transceivers adapted to be connected over a wire line for two-way communication, each transceiver having mechanism adapted to scan a subject copy for transmission and to record received facsimile signals, said mechanism including a rotary member, a first relay adapted to be continuously energized when the machine operates as a transmitter, means for energizing said relay periodically when the machine operates as a receiver, a second relay normally shorted to ground, means controlled by the energized condition of the first relay to unground the second relay at a predetermined moment when the machine operates as a transmitter, means controlled by the release of said first relay at a predetermined moment to unground the second relay when the machine operates as a receiver, and apparatus controlled by the energized condition of the second relay to cause synchronous rotation of said rotary member.

18. A facsimile machine having a scanning member and a synchronous motor for operating same, an interrupter energized from a local source of power to open the motor circuit periodically and thereby cause said motor to run at subsynchronous speed, circuit connections whereby said interrupter operates at the subsynchronous speed of said motor, a second interrupter operated by received current pulses of a frequency corresponding to the synchronous speed of said motor, and apparatus jointly controlled by said two interrupters when they fall into step to disconnect the first interrupter and thereby prevent further interruption of the motor circuit, whereby said motor operates at regular synchronous speed.

19. In a facsimile system, a transmitter and a receiver adapted to be operatively connected, scanning mechanism for the transmitter and recording mechanism for the receiver, means at the transmitter for sending current pulses of predetermined frequency to the receiver, a relay at the receiver energized by said current pulses, a start switch at the receiver operable after the energizing of said relay, apparatus energized by the joint operation of said relay and said switch to place the recording mechanism in recording condition, means at the receiver responsive to the energizing of said apparatus for sending a steady current to the transmitter, and apparatus in the transmitter responsive to said steady current for starting the operation of the scanning mechanism.

20. In a facsimile system, a transmitter and a recorder adapted to be connected for communication, each machine having a rotary scanning drum and a synchronous motor for operating the same, a constantly closed circuit at the transmitter for operating its motor and drum at synchronous speed, means at the transmitter for sending phasing pulses to the receiver in synchronism with the speed of the transmitter drum, interrupter means at the receiver energized from a local source of power independently of said phasing pulses for periodically interrupting the circuit of the receiver motor, which thereby operates at sub-synchronous speed, the energizing circuit of said interrupter means being controlled by the sub-synchronous speed of the receiver motor, other interrupter means at the receiver energized by said phasing pulses so as to operate synchronously with the speed of the transmitter drum, a phasing device at the receiver, and circuit connections whereby said two interrupter means cooperate at a predetermined moment to energize said phasing device and thereby prevent further interruption of the receiver motor circuit, whereby the receiver motor starts running at synchronous speed to rotate the receiver drum in phase with the transmitter drum.

GARVICE H. RIDINGS.

REFERENCES CITED

The following references are of record in the file of this patent:

UNITED STATES PATENTS

| Number | Name | Date |
|---|---|---|
| 1,677,859 | Dudley | July 17, 1928 |
| 2,230,820 | Young | Feb. 4, 1941 |
| 2,450,030 | Wise | Sept. 28, 1948 |